3,845,072
PROCESS FOR THE OXIDATIVE DEHYDRO-
CYCLIZATION OF IMINES
Ugo Romano and Pietro Entonio Maoggi, Milan, and
Marcello Massi Mauri, San Donato Milanese, Italy,
assignors to Snam Progetti S.p.A.
No Drawing. Filed Nov. 2, 1971, Ser. No. 194,926
Claims priority, application Italy, Nov. 2, 1970,
31,260/70
Int. Cl. C07d 27/56
U.S. Cl. 260—319.1      6 Claims

ABSTRACT OF THE DISCLOSURE

Indole and indole derivatives are prepared from imines represented by the formula:

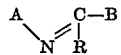

wherein N is nitrogen; C is carbonium; R is a member of the group consisting of hydrogen, alkyl, alkenyl and aryl; A and B are members of the group consisting of alkyl, alkenyl, aryl and aralkyl represented by

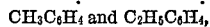

through an oxidative dehydrocyclization process wherein oxygen and the imine (e.g. N-benzylidene-o-toluidine), in the molar range from 0.2:1 to 10:1 are heated together to a temperature in the range of 300° C. to 800° C. in the presence of a catalyst (e.g. active silica) for an apparent contact time ranging from 0.1 to 20 seconds.

---

The present invention relates to a process for the oxidative dehydrocyclization of imines in order to produce heterocyclic compounds containing a nitrogen atom in their heterocyclic ring. More particularly, the present invention relates to a process for the oxidative catalytic dehydrocyclization process of imines whereby heterocyclic compounds are produced which are derivatives of pyrrole and pyridine.

Many nitrogen containing heterocyclic compounds have been synthesized, but the known synthesis methods require expensive starting materials and intricate processes which yield small amounts of the final product. Recently, dehydrocyclization processes have been proposed starting from Schiff bases, obtained from amines and aromatic ketones or aldehydes, in the presence of a catalyst consisting of Cr and Cu at temperatures ranging from 500 to 600° C. It was possible to obtain 2-phenylindole from N-benzal-o-toluidine and from N-(α)-methylbenzal)aniline, or 2-phenylquinoline from N-(α)-ethylbenzal)aniline. However, the aforesaid processes yielded small amounts of the final heterocyclic compound, and the catalyst became inactive after a very short time, because of accumulation of carbon which required frequent regenerations.

It is also known that pyridine may be prepared starting from N-ethylidenepropylamine and from N-propylideneethylamine by means of a dehydrocyclization carried out in the presence of iodine acting as hydrogen acceptor. British Pat. No. 1,184,242 relates to a dehydrocyclization process of imines or amines which is carried out in the vapour and quinoline compounds. However, the employment of iodine as hydrogen acceptor causes very great problems as to plant materials and, from an economical point of view, it has been necessary to use a method for recovering iodine.

It has now been found, which is the subject of the present invention, that it is possible to obtain high yields of heterocyclic compounds, namely pyrrole and pyrridine derivatives, by dehydrocyclization of the corresponding imines in the presence of molecular oxygen or of a gas containing oxygen. The oxidative dehydrocyclization reaction may be carried out on many imines which may be exemplified by the formula:

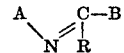

wherein N is nitrogen, C is carbonium, R may be hydrogen, an alkyl, alkenyl or aryl radical, A and B may be an alkyl, alkenyl, aryl or aralkyl radical of the type

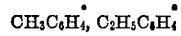

and the like.

The aforesaid radicals may be substituted or unsubstituted, with the provision that A and B, when aryl radicals, have an ortho-position free or substituted by alkyl radicals in order to permit the cyclization. Unrestrictive examples of the inventive process are the prepaartion of 2-methylindole from N-isopropylideneaniline, 2-phenylindole from N-(α-methylbenzal) aniline, 2-phenylindole from N-benzal-o-toluidine, 2,3-dimethylindole from N-(α-methylpropylidene) aniline, phenanthridine from N-benzalaniline, 2-methylquinoline from N-isopropylidene-o-toluidine, 2-phenylquinoline from N-(α-methylbenzal)-o-toluidine, isoquinoline from N-benzalethylamine, pyridine from N-ethylidenepropylamine or from N-propylideneethylamine and so on.

According to the process of the present invention, an imine is reacted at high temperature with molecular oxygen or gas containing oxygen, preferably air. The reaction may be carried out in the presence of inert diluents such as nitrogen, argon, carbon dioxide, steam, benzene and saturated hydrocarbons stable at the reaction conditions. The molar ratio between oxygen and imine in the feeding phase depends on the structure of the reacted imine; however it ranges from 0.2:1 to 10:1 and preferably from 0.8:1 to 2.5:1. The reaction between imine and oxygen, or gas containing oxygen, may be carried out in the absence of catalysts, or use may be made of suitable catalysts.

Unrestrictive examples of contact materials employable according to the process of the present invention are the ones employed as cyclization or oxidation catalysts, namely silica, alumina, silica-alumina, silica-aluminates, oxides or oxide mixtues of alkaline or alkaline-earth metals, oxides or oxide mixtures or compounds of the metals belonging to the 3rd, 4th, 5th, 6th, 7th and 8th groups of the periodic system, for example oxides, oxide mixtures or compounds of La, Ce, Ti, Sn, V, P, Sb, Bi, Cr, Mo, W, Te, Mn, Fe, Co, Ni and some others, each of said materials being employed as such or mixed with another one.

A particularly preferred performance of the inventive process consists in reacting an imine with molecular oxygen or gas containing oxygen in the vapour phase, at high temperature in the presence of a contact material consisting essentially of active silica. The active silica may be prepared according to any method known to those skilled in the art and may be empoyed by any reactor, in a fixed, moxable or fluid bed.

The reaction of the inventive process is carried out in the vapour phase at a temperature ranging between 300 and 800° C. The pressure may vary in the range between a few mm. Hg and 10 atmospheres, atmospheric pressure being preferred.

The apparent contact time between reactants and catalyst ranges between 0.1 and 20 seconds, and particularly between 0.5 and 5 seconds. By contact time we mean the ratio between the volume of the reactor wherein the reaction is carried out and the flow of the reactants as gases under the reaction conditions.

The following illustrative examples show the possible uses of the inventive process in preparing nitrogenous heterocyclic compounds which are interesting from an industrial point of view. Therein the conversion, selectivity and yield are to be understood according to the following definitions:

$$\text{Conversion} = \frac{\text{Moles of reacted imine}}{\text{Moles of fed imine}} \cdot 100$$

$$\text{Selectivity} = \frac{\text{Moles of obtained heterocyclic compound}}{\text{Moles of reacted imine}} \cdot 100$$

$$\text{Yield} = \frac{\text{Moles of obtained heterocyclic compound}}{\text{Moles of fed imine}} \cdot 100$$

Example 1

600 cc. of silica were charged into a stainless steel reactor having a 37.8 mm. internal diameter, the silica having been prepared from a sol of colloidal silica at 30% $SiO_2$, stabilized by $NH_3$ (silica "Ludox A.S."), by means of atomization and extrusion into cylindrical tablets having a 4 mm. diameter, which were then calcined at 500° C. The reactor was fed with N-benzylidene-o-toluidine, air and water at a ratio of 1:4.4:32 at atmospheric pressure and a temperature of 550° C. for a contact time of 1 second. 2-Phenylindole was obtained at a conversion of 50% and a selectivity of 70%.

Example 2

In a reactor of stainless steel having a ⅞" internal diameter were charged 450 cc. of silica, obtained from a sol of colloidal silica (30% of $SiO_2$) stabilized by $NH_3$ (silica "Ludox A.S."), by means of atomization and extrusion into cylindrical tablets having a 4 mm. diameter, which were then calcined at 500° C. At atmospheric pressure the reactor was fed with N-(alpha-methyl) benzylideneaniline (N-α-MBA), air and water at a water/N-α-MBA ratio of 50:1, while the temperature was in the range from 465° C. to 550° C. and the air/N-α-MBA molar ratio ranged from 3:1 to 7:1. The contact time was about 1 second. By changing the temperature and keeping constant the air/N-α-MBA molar ratio (=6:1) the following results were obtained:

| T., ° C | 465 | 505 | 530 | 550 |
|---|---|---|---|---|
| Conv. N-α-MBA, percent | 36 | 50 | 61 | 69 |
| Sel. 2-FI, percent | 51 | 75 | 78 | 71 |

When working at T=520° C. and a varying air/N-α-MBA molar ratio the following results were obtained:

| Moles air/moles N-α-MBA | 3.1 | 3.8 | 4.7 | 5.6 | 6.6 |
|---|---|---|---|---|---|
| Conv. N-α-MBA, percent | 51 | 52 | 53 | 59 | 67 |
| Sel. 2-FI, percent | 84 | 89 | 85 | 77 | 77 |

Example 3

By using the same reactor and catalyst as in the preceding examples, N-α-methylpropylidene) aniline, air and water were fed at 545° C. for a contact time of 0.9 seconds. 2,3-dimethylindole (selectively=60%), 2-methylquinoline (~15%), indole+2-methylindole+2-ethylindole (~5%) were obtained at a conversion of 75%.

Example 4

By using the same reactor and catalyst as in the preceding examples, a feed was carried out, consisting of N-isopropylidene-aniline, air and water at a molar ratio of 1:6:50, at atmospheric pressure, at 570° C. and a contact time of 1 second. 2-methylindole and indole were obtained at a conversion of 65% and a selectivity of 60% and 15%.

Example 5

By working in the same reactor and with the same catalyst as in the preceding example, use was made of a feed consisting of N-(alpha-methyl) benzylidene-p-chloroaniline, air and water at a molar ratio of 1:6:50, a mean temperature of 585° C., atmospheric pressure and a contact time of 1 second. 2-Phenyl-5-chloroindole was obtained at a 65% selectivity and at an imine conversion of 73%.

What we claim is:

1. A process for the production of high yields of indole and alkyl, aralkyl and phenyl substituted indoles through the oxidative dehydrocyclization of imines wherein oxygen and the corresponding imine represented by the formula

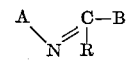

wherein N is nitrogen; C is carbonium; R is a member of the group consisting of hydrogen, lower alkyl, lower alkenyl and carbocyclic monocyclic aryl; A and B are members of the group consisting of lower alkyl, lower alkenyl, monocyclic carbocyclic arly and aralkyl represented by $CH_3C_6H._4$ and $C_2H_5C_6H._4$, are caused to react in the vapor phase by heating said oxygen and imine together in the molar range from 0.2:1 to 10:1 to a temperature in the range of 300° to 800° C. for a time ranging from 0.1 to 20 seconds in the presence of activated silica and steam.

2. A process according to Claim 1 characterized in that the imine is N-benzylidene-o-toluidine.

3. A process according to Claim 1 characterized in that the imine is N-(alpha-methyl) benzylidene aniline.

4. A process according to claim 1 characterized in that the imine is N-(alpha-methyl-propylidene) aniline.

5. A process according to Claim 1 characterized in that the imine is N-isopropylidene aniline.

6. A process according to Claim 1 characterized in that the imine is N-(alpha-methyl) benzylidene-p-chloroaniline.

References Cited

UNITED STATES PATENTS

| 3,271,414 | 9/1966 | Frangatos | 260—319.1 |
| 3,458,520 | 7/1969 | Bell et al. | 260—290 P |
| 3,463,781 | 8/1969 | Bell et al. | 260—283 S Y |
| 3,631,050 | 12/1971 | Elslauer | 260—283 SY |

OTHER REFERENCES

Hansch, et al., Jour. Am. Chem. Soc., vol. 73, pp. 704–6 (1951).

Hansch et al., Jour. Am. Chem. Soc., vol. 74, pp. 4554–5 (1952).

DONALD G. DAUS, Primary Examiner

U.S. Cl. X.R.

260—283 SY, 290 P